Figure 1:
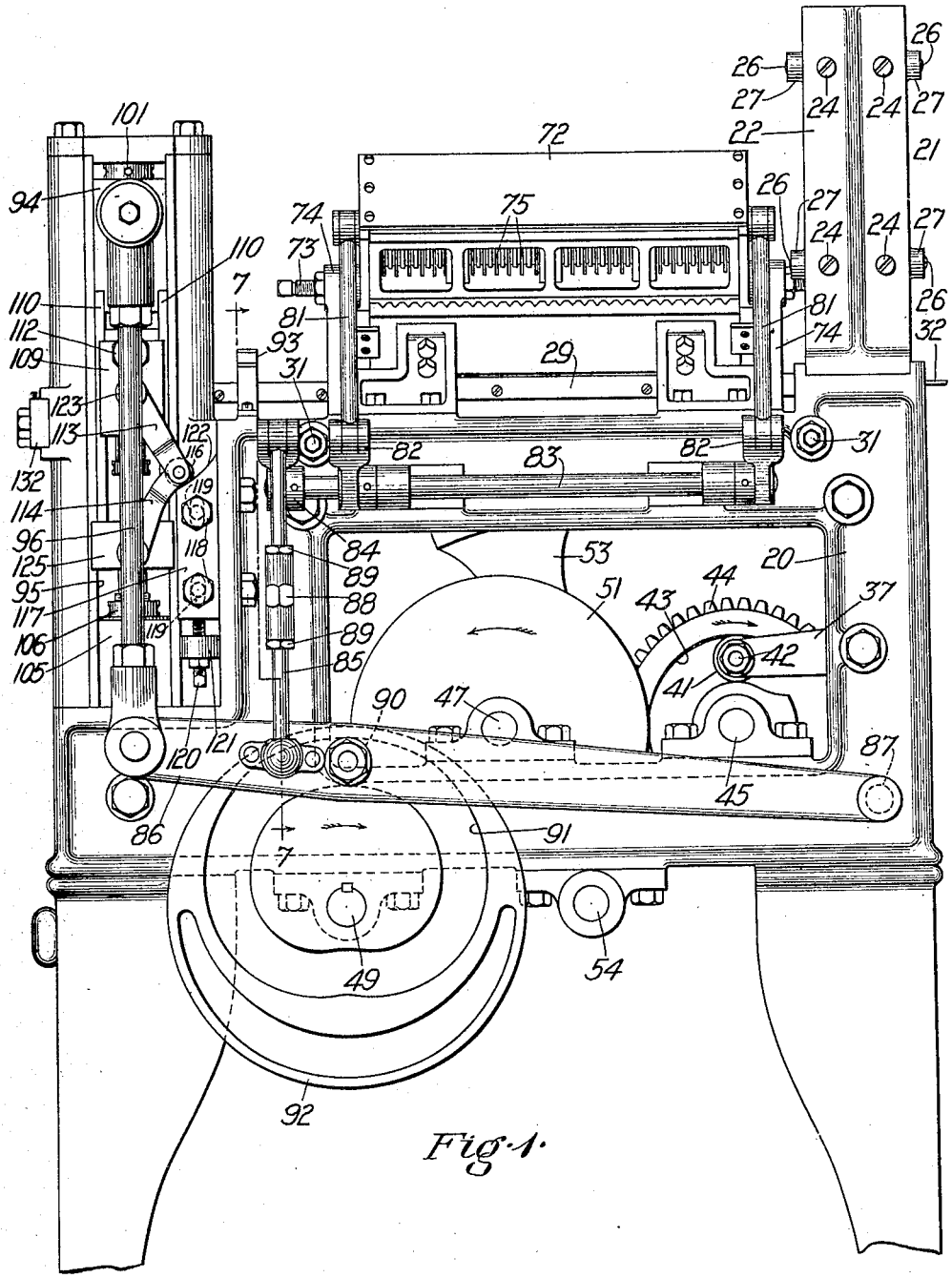

B. B. WATERMAN.
MACHINE FOR TACKING SHOE SHANKS.
APPLICATION FILED DEC. 13, 1907.

904,032.

Patented Nov. 17, 1908.
9 SHEETS—SHEET 1.

Witnesses:
William C. Glass
Francis H. Bishop

Inventor:
Bradford B. Waterman,
by his attorney, Charles S. Goodwin

B. B. WATERMAN.
MACHINE FOR TACKING SHOE SHANKS.
APPLICATION FILED DEC. 13, 1907.

904,032.

Patented Nov. 17, 1908.
9 SHEETS—SHEET 4.

Witnesses:
William C. Glass
Francis H. Bishop

Inventor:
Bradford B. Waterman,
by his attorney, Charles S. Gooding.

B. B. WATERMAN.
MACHINE FOR TACKING SHOE SHANKS.
APPLICATION FILED DEC. 13, 1907.

904,032.

Patented Nov. 17, 1908.
9 SHEETS—SHEET 5.

Witnesses:
William C. Glass
Francis H. Bishop

Inventor:
Bradford B. Waterman
by his attorney,
Charles S. Gooding.

B. B. WATERMAN.
MACHINE FOR TACKING SHOE SHANKS.
APPLICATION FILED DEC. 13, 1907.

904,032.

Patented Nov. 17, 1908.
9 SHEETS—SHEET 6.

Witnesses:
William C. Glass
Francis H. Bishop

Inventor:
Bradford B. Waterman,
by his attorney, Charles S. Goodwin.

B. B. WATERMAN.
MACHINE FOR TACKING SHOE SHANKS.
APPLICATION FILED DEC. 13, 1907.

904,032.

Patented Nov. 17, 1908.
9 SHEETS—SHEET 7.

Witnesses:
William C. Glass
Francis H. Bishop

Inventor:
Bradford B. Waterman
by his attorney, Charles S. Goodwin

B. B. WATERMAN.
MACHINE FOR TACKING SHOE SHANKS.
APPLICATION FILED DEC. 13, 1907.

904,032.

Patented Nov. 17, 1908.
9 SHEETS—SHEET 8.

B. B. WATERMAN.
MACHINE FOR TACKING SHOE SHANKS.
APPLICATION FILED DEC. 13, 1907.
904,032.
Patented Nov. 17, 1908.
9 SHEETS—SHEET 9.
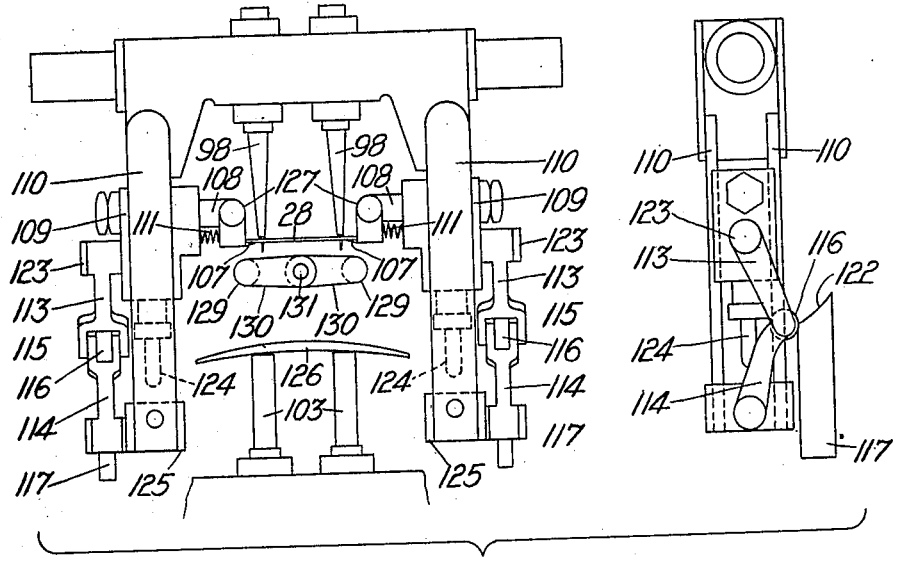
Fig. 13.
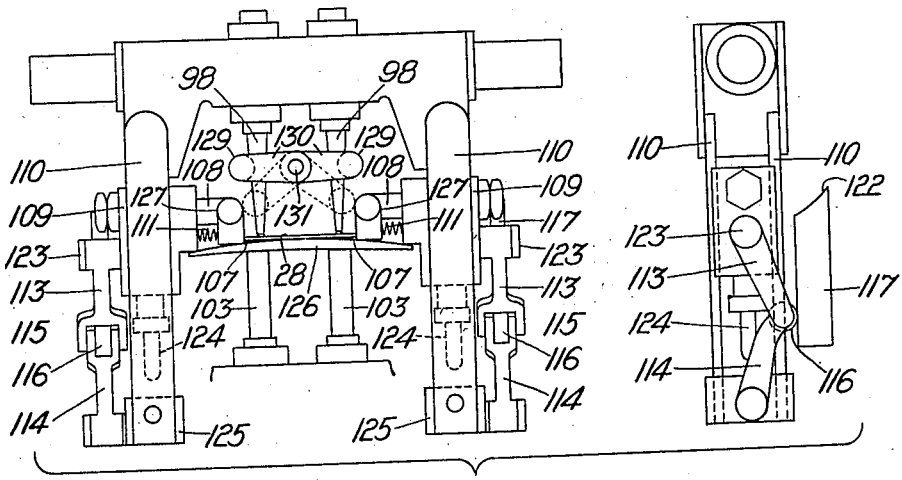
Fig. 14.
Fig. 15.
Witnesses:
William C. Glass
Francis H. Bishop
Inventor:
Bradford B. Waterman,
by his attorney, Charles T. Gooding.

UNITED STATES PATENT OFFICE.

BRADFORD B. WATERMAN, OF EAST BRIDGEWATER, MASSACHUSETTS, ASSIGNOR TO THE AMERICAN SHOE FINDING COMPANY, A CORPORATION OF MAINE.

MACHINE FOR TACKING SHOE-SHANKS.

No. 904,032.            Specification of Letters Patent.            Patented Nov. 17, 1908.

Application filed December 13, 1907. Serial No. 406,309.

*To all whom it may concern:*

Be it known that I, BRADFORD B. WATERMAN, a citizen of the United States, residing at East Bridgewater, in the county of Plymouth and State of Massachusetts, have invented new and useful Improvements in Machines for Tacking Shoe-Shanks, of which the following is a specification.

This invention relates to improvements in machines for fastening two pieces of material together and particularly to machines for fastening curved metal stiffeners to leatherboard shoe shanks preferably by means of tacks or the like extending through perforations in said stiffeners. Heretofore, great difficulty has been experienced in tacking stiffeners having a curvature of small radius to shoe shanks for use in shoes having high arches.

One of the objects of my invention is to provide a machine which will straighten a stiffener of any curvature and while it is straight tack it to a leatherboard shoe shank after which the stiffener is released and allowed to resume its original curvature thereby curving the leatherboard, and the object is further to effect improvements in the devices for introducing tacks in the perforations of the stiffeners, whereby each stiffener shall not fail to receive its full complement of tacks.

Other objects and advantages will appear hereinafter.

The invention consists in the combination and arrangement of parts set forth in the following specification and particularly pointed out in the appended claims.

Figure 2:
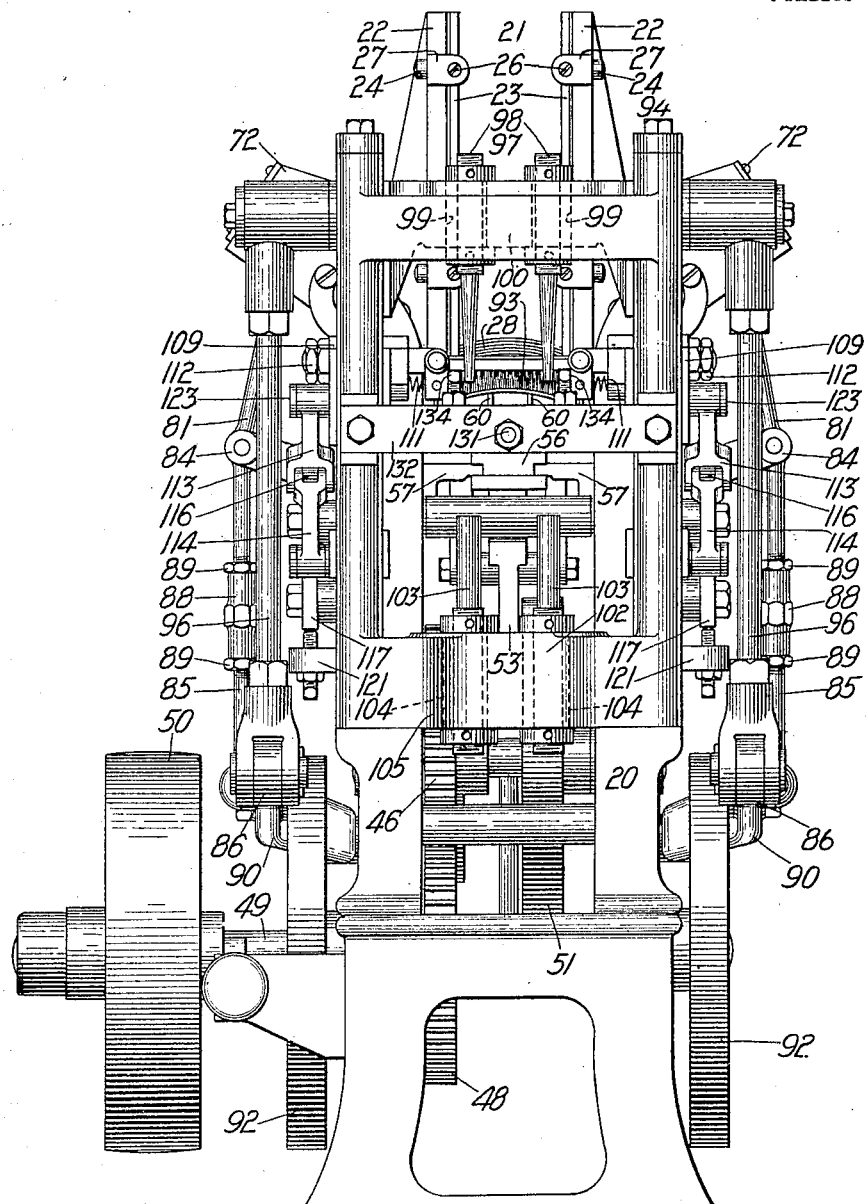
Figure 3:
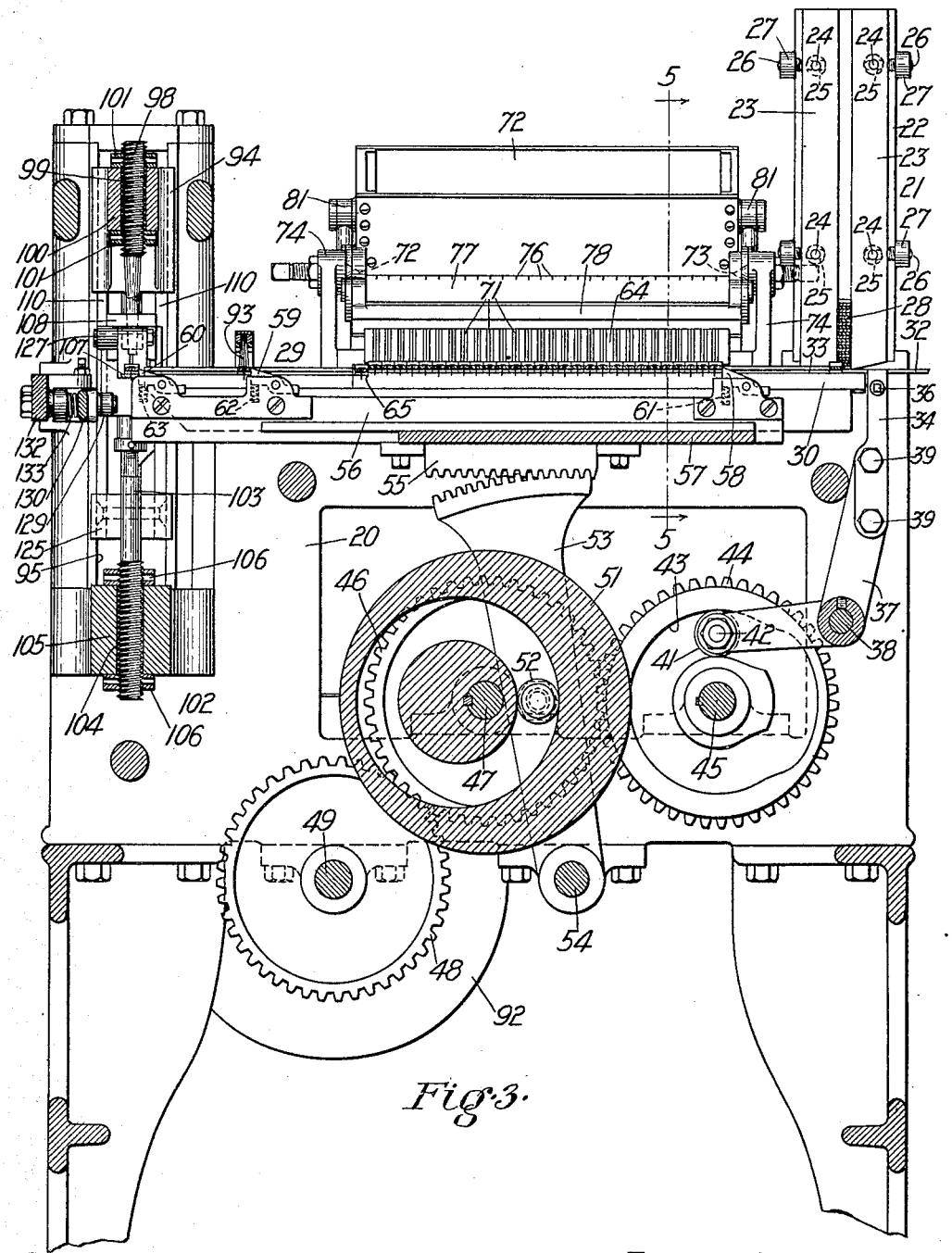
Figure 4:
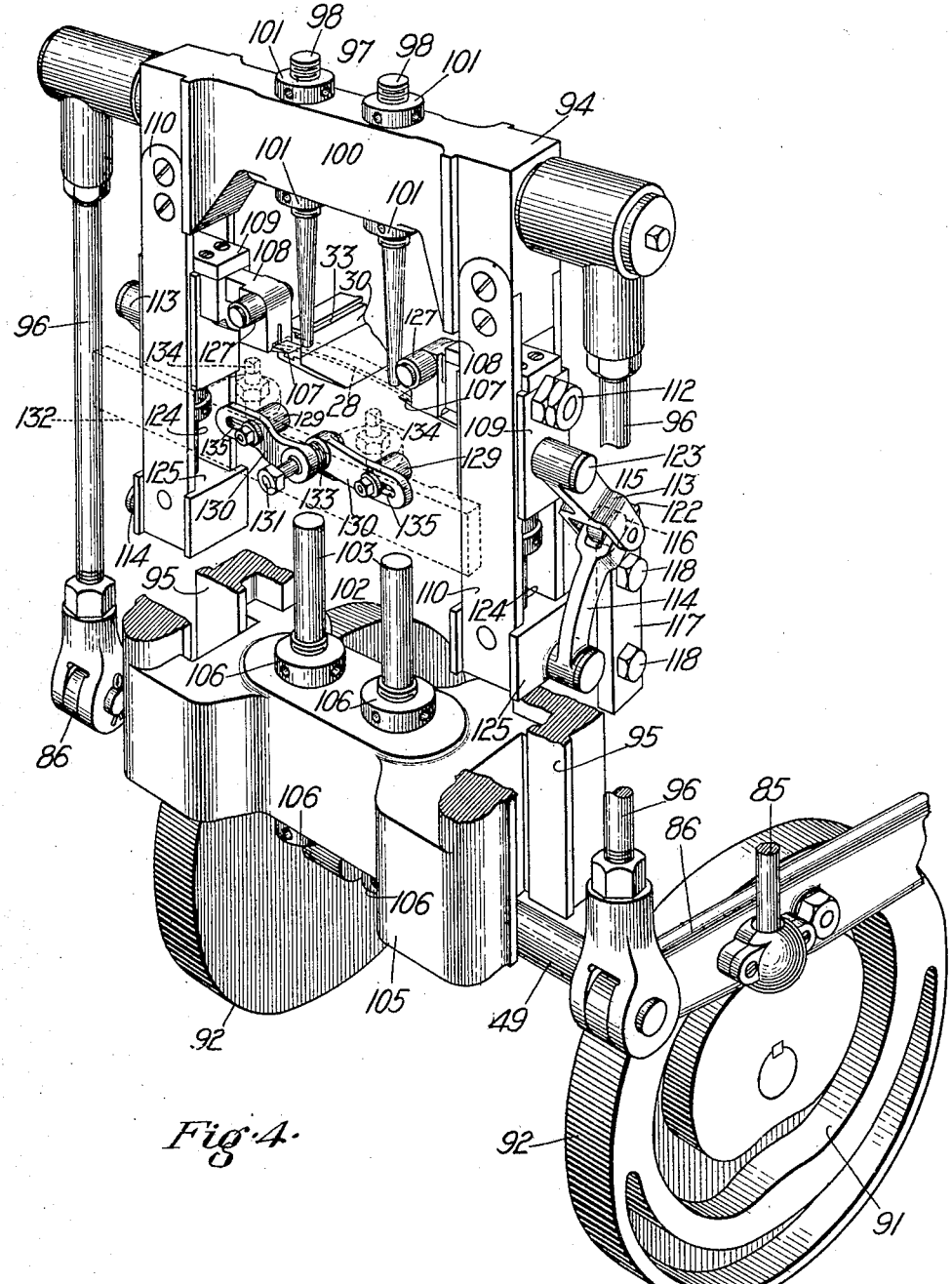
Figure 5:
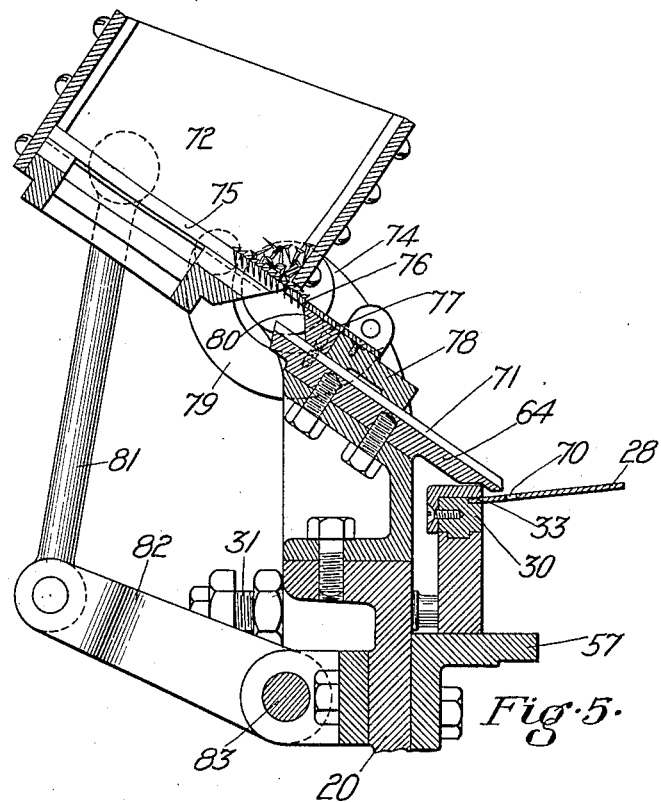
Figure 6:
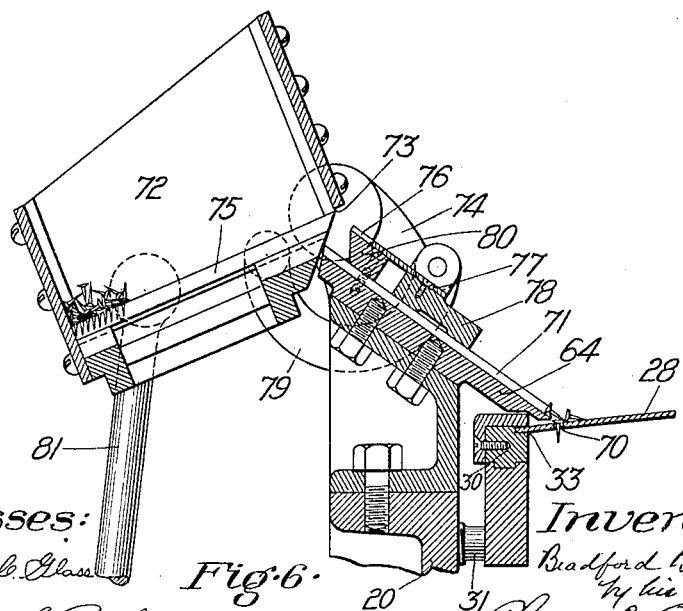
Figure 7:
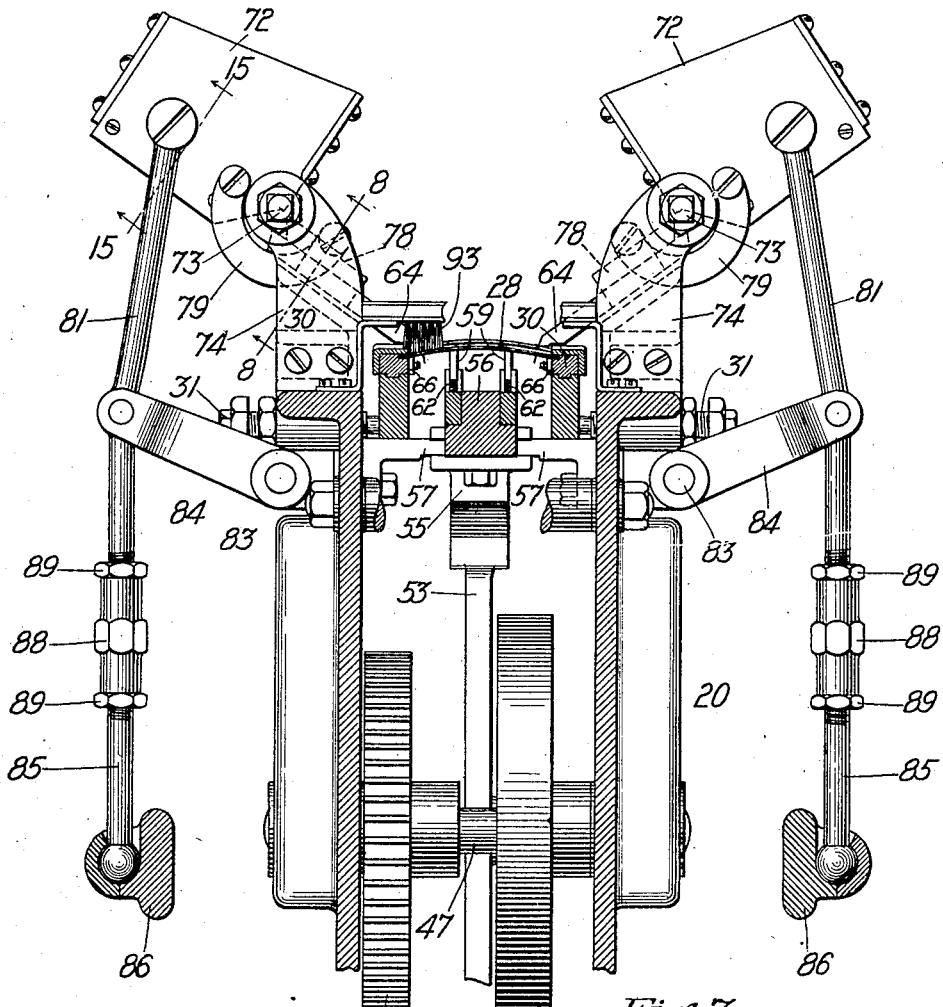
Figure 8:
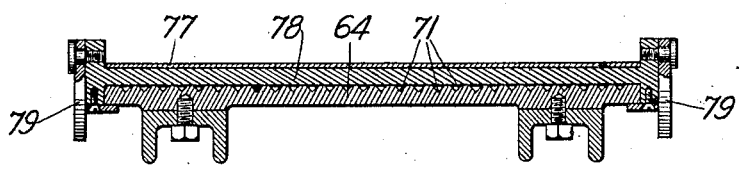
Figure 9:
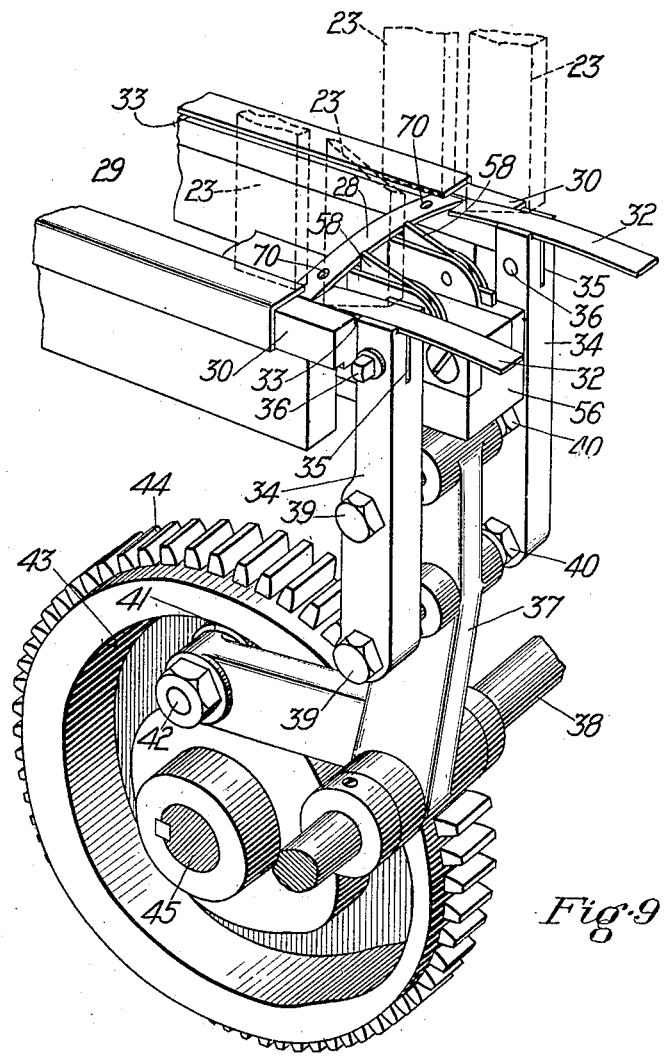
Figure 10:
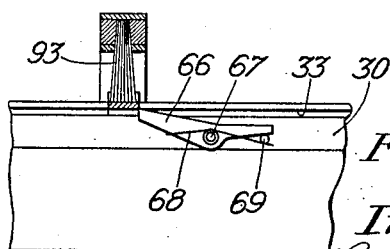
Figure 11:
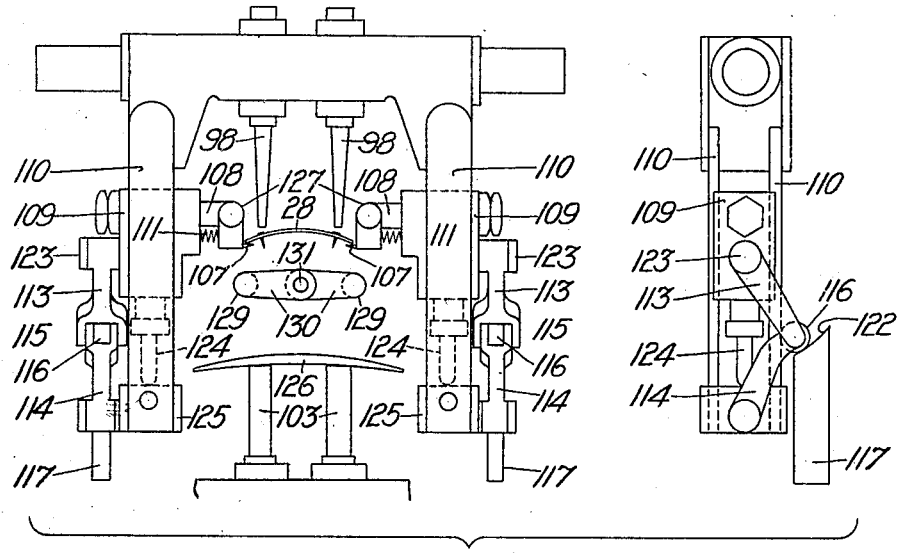
Figure 12:
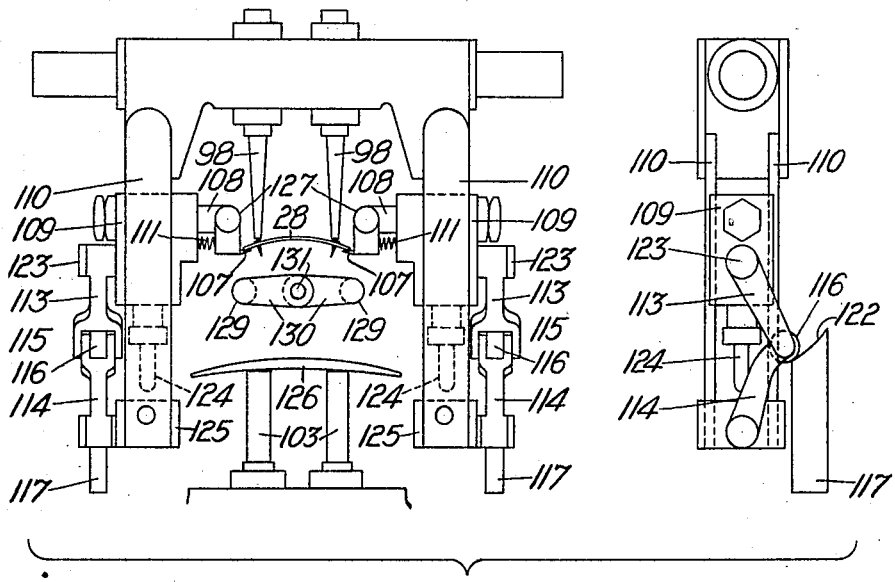

Referring to the drawings: Figure 1 is a side elevation of my improved machine for tacking stiffeners to shoe shanks. Fig. 2 is a front elevation of the same, viewed from the left of Fig. 1. Fig. 3 is a longitudinal sectional elevation. Fig. 4 is an enlarged detail perspective view of a portion of the front of the machine illustrating the mechanism for straightening the stiffeners and tacking the same to a leatherboard shoe shank. Fig. 5 is an enlarged detail sectional elevation taken on line 5—5 of Fig. 3 showing the tack hopper in its uppermost position. Fig. 6 is a section similar to Fig. 5 showing the tack hopper in its lowermost position. Fig. 7 is an enlarged detail sectional elevation taken on line 7—7 of Fig. 1, looking toward the right. Fig. 8 is a detail section taken on line 8—8 of Fig. 7, looking toward the left. Fig. 9 is an enlarged detail perspective view of the mechanism for feeding the stiffeners from the column of stiffeners in the vertical raceway. Fig. 10 is a detail longitudinal section showing one of the detent pawls located between the tack introducing means and the driving means. Fig. 11 is a diagrammatic view showing in front and side elevation the mechanism for straightening and driving the tacks into the leatherboard shoe shank, illustrating the mechanism in its initial position. Fig. 12 is a diagrammatic view showing in front and side elevation the same mechanism in a second position with the drivers in contact with the tack heads. Fig. 13 is a diagrammatic view showing in front and side elevation the same mechanism with the stiffener fully straightened ready to be tacked to the leatherboard. Fig. 14 is a diagrammatic view showing in front and side elevation the same mechanism with the tacks driven through the leatherboard shank and clenched against the anvils. Fig. 15 is a detail sectional elevation taken on line 15—15 of Fig. 7 looking toward the left.

Like numerals refer to like parts throughout the several views of the drawings.

In the drawings, 20 is the frame of the machine comprising two side members on which is mounted a vertical raceway 21 comprising two brackets 22, 22 and four vertical guides 23. The guides 23 are secured to the brackets 22 by means of screws 24 extending through slotted holes 25 in said brackets, said holes permitting the guides of each pair to be adjusted toward and away from each other to accommodate stiffeners of various widths. Adjusting screws 26 having screw-threaded engagement with ears 27 formed on the brackets 23 serve to adjust the guides 23 of each pair toward each other and when properly adjusted, said guides are rigidly clamped to said brackets by means of the screws 24. The vertical raceway 21 is adapted to receive a column of steel stiffeners 28, the ends of which are located between the guides 23. The brackets 22, 22 may be adjusted toward and away from each other to accommodate stiffeners of various lengths. Normally the lowermost stiffener of the column of stiffeners 28 located in the raceway 21 rests on a horizontal raceway 29 which comprises two guides 30, 30 on which the ends of said stiffener are supported. The guides 30, 30 may be adjusted toward and away from each other by means of adjusting screws 31 to accommodate stiffeners of greater or less length.

I will now proceed to describe the mechanism which feeds the lowermost stiffener from the column of stiffeners located in the raceway 21.

Two fingers 32, 32 which at all times rest in grooves 33, 33 formed in the guides 30, 30, respectively, are fast to arms 34, 34, respectively, each of said arms being split as at 35 and two clamping screws 36 being provided to draw the split portions of the arms 34 together to clamp the fingers 32 therein. The arms 34, 34 are adjustably connected to a bell crank lever 37 mounted to rock on a shaft 38. The arms 34, 34 may be adjusted toward and away from each other by means of four screws 39 having screw-threaded engagement with the bell crank lever 37, there being four nuts 40 having screw-threaded engagement with said screws and serving to clamp said arms against the heads of said screws. Thus it will be seen that when the guides 30, 30 are adjusted with relation to each other, the arms 34, 34 carrying the fingers 32, 32 may be adjusted accordingly. A cam roll 41 journaled on a stud 42 fast to the bell crank lever 37 is located in a cam groove 43 formed in the face of a gear wheel 44, said cam groove being adapted to impart a rocking motion to the bell crank lever 37, whereby the fingers 32 are caused to feed the stiffeners 28 one by one from beneath the pile of stiffeners located in the raceway 21, as will be more fully described hereinafter. The gear 44 is fast to a shaft 45 journaled in suitable bearings on the frame 20 and meshes into a gear 46 fast to a shaft 47 also journaled in suitable bearings on said frame. The gear 46 meshes into a gear 48 fast to a main driving shaft 49 to which is fast a driving pulley 50, said shaft being journaled in suitable bearings on the frame 20.

I will now proceed to describe the feeding mechanism which feeds the stiffeners from the first mechanism just described and feeds them along the horizontal raceway 29.

Fast to the shaft 47 is a cam 51 having a groove in which is located a cam roll 52 rotatably mounted on a segmental gear 53 pivoted at 54 on the frame 20. The segmental gear 53 meshes into a rack 55 fast to a feed slide 56 mounted to slide on guides 57, 57. On the feed slide 56 three pairs of feed pawls 58, 58, 59, 59, and 60, 60 are pivotally mounted. The feed pawls 58, 58 are pressed upwardly by springs 61, 61, the feed pawls 59, 59 are pressed upwardly by springs 62, 62, and the pawls 60, 60 are pressed upwardly by springs 63, 63. As the feed slide 56 is reciprocated the feed pawls 58, 58 are moved toward the right from the position shown in Fig. 3 and passing beneath the lowermost stiffener which has been previously moved a portion of its width transversely of the column of stiffeners by the first feeding mechanism, said feed pawls pass beyond the right hand edge of said stiffener and spring upwardly into contact with the lower face of the stiffener located above the lowermost stiffener. The feed pawls now being in the proper position to engage the right hand edge of the lowermost stiffener, the feed slide 56 moves toward the left (Fig. 3) and said feed pawls move said stiffener toward the left, thereby adding said stiffener to a row of stiffeners located beneath two multi-grooved raceways 64, 64 and moving said row toward the left a distance equal to the width of one stiffener. The guides 30, 30 are provided at 65, 65 with a stepdown portion which is below the level of the row of stiffeners located beneath the raceways 64, 64. Thus it will be seen that as the row of stiffeners is moved toward the left as just described the left hand stiffener in said row will drop onto the stepdown portion 65 with its right hand edge adjacent to the shoulder at that point on the guides. The next movement of the feed slide 56 toward the right causes the feed pawls 59, 59 to pass beneath the stiffener located against the shoulders just described and engage the right hand edge of said stiffener. The next movement of the feed slide 56 toward the left causes the feed pawls 59, 59 to feed the stiffener toward the left a distance equal to the throw of said slide leaving the stiffener in the proper position to be engaged by the feed pawls 60, 60 at the next reciprocation of the feed slide 56 and carried its last step toward the left into its final proper relation with the bending and driving instrumentalities. It will be seen that as the feed pawls 59, 59 pass beneath the stiffener which is located against the shoulders of the stepdown portions 65, 65, said shoulders prevent the friction of said feed pawls with the underside of said stiffener from moving said stiffener toward the right. It will be seen that as the feed pawls 60, 60 pass beneath the stiffener during the movement of the feed slide 56 toward the right the friction of said feed pawls tends to move said stiffener toward the right. To overcome this tendency, I provide two stop pawls 66, 66 one of which is shown in detail in Fig. 10, said stop pawl being pivoted at 67 to the guide 30. A spring 68 is arranged to normally press the left hand end of the feed pawl 66 upwardly and a stop 69 is arranged to limit the upward movement thereof. Thus it will be seen that the stop pawls 66, 66 prevent movement of each stiffener toward the right after said stiffener has passed beyond the left hand ends of said feed pawls.

I will now proceed to describe the instrumentalities for introducing tacks into the perforations 70, 70 of the stiffeners 28.

Referring now particularly to Figs. 5 to 8, inclusive, it will be seen that each of the raceways 64 is provided with a plurality of inclined grooves 71 preferably V-shaped in cross section, said grooves being adapted to guide tacks placed therein point downward into the perforations 70 of the stiffeners 28. Two rocking hoppers or carriers 72, 72 are pivoted at 73, 73 on brackets 74. Each of the hoppers 72 is provided with a plurality of grooves 75 located in vertical alinement with the grooves 71. The hoppers 72 are adapted to contain tacks and as said hoppers are rocked on their pivots from the position shown in Fig. 6 to the position shown in Fig. 5, a portion of the tacks located in said hoppers find their way into the grooves 75 and as said hoppers reach the position shown in Fig. 5 these tacks are delivered by said grooves into slots 76 formed in plates 77. The plates 77 are fast, respectively, to slides 78 connected by links 79 to the hoppers 72, whereby as said hoppers are rocked on their pivots a reciprocatory motion is imparted to the plates 77. Located beneath the plates 77, respectively, are stationary bars 80 so formed and placed that, as seen in Fig. 5, the points of the lowermost tacks located in the slots 76 rest against the bars 80 and it will be seen that as the plates 77 are moved downwardly the tacks located in said slots are deposited into the grooves 71, said tacks passing down said grooves into the perforations 70.

I will now proceed to describe the mechanism for imparting the rocking motion to the hoppers 72.

To each of the hoppers 72 are pivotally connected two links 81, 81, said links being pivotally connected at their lower ends to rocker arms 82, respectively, said rocker arms being fast to two rock shafts 83 mounted to rock in suitable bearings on the frame 20. Two rocker arms 84 also fast to the rock shafts 83, respectively, are connected by links 85 to two levers 86, 86, respectively, said levers being pivoted at 87 on the frame 20 of the machine. Each of the links 85 preferably comprises in its construction a right and left screw-threaded sleeve nut 88 and two check nuts 89, 89 which serve as an adjustment to increase or diminish the length of said links. It will be seen that the lower ends of the links 85 have ball and socket connection with the levers 86, respectively, these connections permitting swinging movement of said links in two directions. Two cam rolls 90, 90 rotatably mounted on the levers 86, 86, respectively, are located in cam grooves 91, 91 formed in cams 92, 92, respectively, said cams being fast to the main driving shaft 49. Thus it will be seen that as the shaft 49 is rotated a rocking motion is imparted to the levers 86 which acts through the links 85, arms 84, rock shafts 83, arms 82, and links 81 to impart a rocking movement to the hoppers 72. It will be readily apparent that as the row of stiffeners is fed beneath the raceways 64, by reason of the multiplicity of grooves in said raceways and by reason of the fact that with each reciprocation of the plates 77 one or more tacks is deposited into each of the grooves 71, each of the perforations 70 is certain to receive a tack. After the perforations have been filled with tacks the superfluous tacks which continue to come down the raceways fall onto the upper faces of the stiffeners 28 and these superfluous tacks may be brushed off by means of a brush 93 extending transversely of the guides 30. A suitable pan, not shown, may be provided to catch these superfluous tacks as they fall.

I will now proceed to describe the mechanism which receives the stiffeners one by one from the horizontal raceway 29 and which straightens said stiffeners and tacks them to leather board shoe shanks.

A driver slide 94 mounted to slide in ways 95 in the frame 20 is connected by two links 96, 96 to the levers 86, 86 so that as said levers are rocked by their respective cams 92 a reciprocatory movement is imparted to the driver slide 94. A driver 97 is preferably made in two parts 98, 98 which will be hereinafter referred to as drivers. The drivers 98 extend vertically through slotted holes 99 formed in a yoke 100 constituting a part of the driver slide 94. Two nuts 101, 101 having screw-threaded engagement with each of the drivers 98 serve to fasten said drivers in position on the yoke 100 when properly adjusted thereon. It will be understood that the drivers 98 are adjustable toward and away from each other to accommodate stiffeners having their perforations located at different distances apart and said drivers are also adjustable vertically for a purpose which will be referred to more particularly hereinafter. An anvil 102 is preferably formed in two parts 103, 103 each of which will be hereinafter referred to as an anvil. The anvils 103 extend through slotted holes 104, 104, respectively, said holes being formed in a cross piece or yoke 105 constituting a part of the frame 20 and said anvils like the drivers 98 are adjustable toward and away from each other and also vertically. Nuts 106 having screw-threaded engagement with the anvils 103 serve to secure said anvils in their proper relation with each other on the yoke 105. Two supports 107, 107 are preferably removably secured to carriers 108, 108, respectively, said carriers being slidably mounted in slides 109, 109, respectively, said carriers being slidable toward and away from each other and said slides being slidably mounted in ways 110 forming a part of the driver slide 94. Two springs 111 are arranged to move the carriers 108 toward each other, while the nuts 112 having screw-threaded engagement with said carriers limit their movement toward each other. Each of the slides 109 is connected to the driver slide 94 by means of two links 113 and 114 pivotally connected to each other and to said slides and constituting a toggle 115. On each of the toggles 115 is journaled a cam roll 116 adapted to coöperate with a cam 117 adjustably secured to the frame 20 by means of screws 118 which pass through slots 119 formed in said cams, whereby said cams may be adjusted vertically. Two adjusting screws 120 having screw-threaded engagement with ears 121 are adapted to be used to adjust the cams 117 vertically, said cams when properly adjusted being clamped by means of the screws 118. Each of the cams 117 is provided with an inclined surface 122 which may be tangent to arcs of circles struck from the centers of pivots 123 of the links 113 or, if desired, said surfaces may be formed on an arc of a circle struck from said centers. Two stop screws 124, 124 having screw-threaded engagement with the slides 109, 109, respectively, are adapted to strike blocks 125, 125 forming portions of the driver slide 94, said stop screws serving to limit the downward movement of the slides 109 with relation to said driver slide.

In the initial position of the machine the supports 107 are located in proper alinement with the guides 30 so that the feeding mechanism hereinbefore described feeds the stiffeners onto said supports, the position of said stiffener on said supports being shown in dotted lines, Fig. 4, and in full lines in Figs. 11 to 14, inclusive. In the initial position of the parts the drivers 98 are located a slight distance above the heads of the tacks located in the perforations in the stiffener which rests upon the supports 107, as shown in Fig. 11. Owing to the shape and location of the surfaces 122 of the cams 117, when the downward movement of the driver slide 94 commences, the swinging movement of the links 113 is such that the slides 109 are for the time being held stationary and, therefore, as the drivers 98 move downwardly from the position shown in Fig. 11 to the position shown in Fig. 12, said drivers strike the heads of the tacks located in the stiffener and the supports 107 being stationary, continued downward movement of the drivers 98 to the position shown in Fig. 13 results in the stiffener being straightened as shown in said figure. At this moment, the cam rolls 116 pass from the surfaces 122 onto the vertical faces of the cams 117 and, therefore, the relative movement of the drivers 98 and supports 107 ceases and said drivers and said supports move downwardly in unison, holding the stiffener straight and in this condition the tacks located in said stiffener are thus brought into contact with and driven through a leatherboard shoe shank 126 which has been placed by the operator on the anvils 103, said tacks being clenched against said anvils. It will be seen that the supports 107 are at this time located between the stiffener 28 and the leatherboard shoe shank 126 and these supports must now be withdrawn from engagement therewith. I will now proceed to describe the mechanism for withdrawing the supports 107 from said engagement.

As the carriers 108 are moved downwardly, two rolls 127 journaled on said carriers, respectively, engage studs 129, 129 mounted on arms 130, 130 pivoted on a stud 131 mounted on a bracket 132. A helical torsional spring 133 is connected to the arms 130 and is adapted to normally hold said arms in contact with stop-screws 134, respectively, said screws having screw-threaded engagement with the bracket 132 and being vertically adjustable thereon. As the rolls 127 strike the studs 129 in the downward movement of the carriers 108, the arms 130 are rocked downwardly on their pivot and said rolls pass by and beneath said studs and under the influence of the spring 133 the arms 130 return to their initial position in contact with the stop screws 134. Now when the upward movement of the carriers 108 takes place, the studs 129 act as cams on the rolls 127 forcing the carriers 108 apart against the tension of the springs 111 and thus causing the supports 107 to be withdrawn from between the ends of the stiffener 28 and the leatherboard shoe shank 126 and the finished article is thus free to be removed by the operator. By means of the nuts 112 the carriers 108 and supports 107 may be adjusted toward and away from each other to accommodate stiffeners of greater or less length and correspondingly the studs 129 may be adjusted toward and away from each other in the slots 135 formed in the arms 130, respectively. The adjustment of the cams 117 and stops 124 is for the purpose of determining the initial position of the supports 107 so that said supports will be located in proper alinement with the guides 30.

The general operation of the machine hereinbefore specifically described is as follows: The primary feeding mechanism which comprises the fingers 32 feeds the stiffeners 28 one by one from the bottom of the column of stiffeners located in the vertical raceway 21 moving each of said stiffeners a portion of its width transversely of the column. The secondary feed mechanism comprising the feed pawls 58, 59 and 60 feeds said stiffeners in a continuous row beneath the raceways 64 and separates said stiffeners from said row one at a time and moves them onto the supports 107. As the stiffeners pass beneath the raceways 64 each of said stiffeners receives tacks in its perforations as hereinbefore described. The operator of the machine places the leatherboard shoe shanks 126 on the anvils 103 with each reciprocation of the drivers 98 and said drivers and the supports 107 coöperate, as hereinbefore described, to straighten the stiffener and when thus straightened the drivers 98 coöperate with the anvils 103 to drive the tacks through the shank 126. The supports 107 are then withdrawn from between the stiffener 28 and the shank 126 and the operator grasps the finished article and lays it aside, and as the drivers 98 move upwardly the operator places another shank onto the anvils 103 ready for the next stiffener.

Having thus described my invention, what I claim and desire by Letters Patent to secure is:

1. In a machine for fastening a curved metal stiffener to a leatherboard shoe shank, means to support said stiffener, two driving members relatively movable, and mechanism operatively connecting said means to one of said driving members to cause said means and said member which is connected thereto to positively coöperate to straighten said stiffener, said driving members being adapted to coöperate to fasten said stiffener to said shoe shank.

2. In a machine for fastening a curved metal stiffener to a leatherboard shoe shank, means to support said stiffener, an anvil and a driver relatively movable, and mechanism operatively connecting said means to said driver to cause said means and said driver to positively coöperate to straighten said stiffener, said driver and said anvil being adapted to coöperate to fasten said stiffener to said shoe shank.

3. In a machine for fastening a metal stiffener to a leatherboard shoe shank, two supports upon which the ends of said stiffener are adapted to rest, respectively, a driver and an anvil relatively movable and adapted to coöperate to fasten said stiffener to said shoe shank, and means to move said supports out of engagement with said stiffener.

4. In a machine for fastening a metal stiffener to a leatherboard shoe shank, two supports upon which the ends of said stiffener are adapted to rest, respectively, a driver and an anvil relatively movable and adapted to coöperate to fasten said stiffener to said shoe shank, and means to move said supports out of engagement with said stiffener after said stiffener has been fastened to said shoe shank.

5. In a machine for fastening a curved metal stiffener to a leatherboard shoe shank, instrumentalities adapted to positively coöperate to straighten said stiffener and fasten the same to said shoe shank, said instrumentalities comprising means to support said stiffener, a member movable relatively to said means and adapted to engage said stiffener, and mechanism operatively connecting said member to said supporting means.

6. In a machine for fastening a curved metal stiffener to a leatherboard shoe shank, instrumentalities adapted to positively coöperate to straighten said stiffener and fasten the same to said shoe shank, said instrumentalities comprising two relatively movable members adapted to engage said stiffener, and mechanism operatively connecting said members to cause the same to straighten said stiffener.

7. In a machine for fastening a metal stiffener to a leatherboard shoe shank, two supports upon which the ends of said stiffener are adapted to rest, respectively, a raceway, means to move said stiffener from said raceway onto said supports, a driver and an anvil relatively movable and adapted to coöperate to fasten said stiffener to said shoe shank, and means for moving said supports out of engagement with said stiffener.

8. In a machine for fastening a curved metal stiffener to a leatherboard shoe shank, means to support said stiffener, a raceway, means to move said stiffener from said raceway onto said supporting means, an anvil, and a driver relatively movable, and mechanism operatively connecting said means to said driver to cause said means and said driver to positively coöperate to straighten said stiffener, said driver and said anvil being adapted to coöperate to fasten said stiffener to said shoe shank.

9. In a machine for fastening a curved metal stiffener to a leatherboard shoe shank, an anvil, means to support said stiffener, said means being movable toward and away from said anvil, a driver movable toward and away from said anvil, and mechanism operatively connecting said means to said driver to cause said means to positively coöperate with said driver to straighten said stiffener, said driver and said anvil being adapted to coöperate to subsequently fasten said stiffener to said shoe shank.

10. In a machine for fastening a curved metal stiffener to a leatherboard shoe shank, an anvil, two supports upon which the ends of said stiffener are adapted to rest, respectively, said supports being movable toward and away from said anvil, a driver movable toward and away from said anvil, said driver, anvil and supports being adapted to coöperate to straighten said stiffener and fasten the same to said shoe shank, and means to move said supports out of engagement with said stiffener.

11. In a machine for fastening a curved metal stiffener provided with perforations to a leatherboard shoe shank, means for introducing tacks into said perforations, and instrumentalities adapted to positively coöperate to straighten said stiffener and fasten the same to said shoe shank, said instrumentalities comprising means to support said stiffener, a member movable relatively to said means and adapted to engage said stiffener, and mechanism operatively connecting said member to said support.

12. In a machine for fastening a curved metal stiffener provided with perforations to a leatherboard shoe shank, means for introducing tacks into said perforations, two supports upon which the ends of said stiffener are adapted to rest, respectively, a driver and an anvil relatively movable, said driver, anvil and supports being adapted to coöperate to straighten said stiffener and drive said tacks into said shoe shank, and means for withdrawing said supports from engagement with said stiffener.

13. In a machine for fastening a curved metal stiffener provided with perforations to a leatherboard shoe shank, means for introducing tacks into said perforations, an anvil, means to support said stiffener, said means being movable toward and away from said anvil, means to move said stiffener from said tack introducing means onto said supporting means, a driver movable toward and away from said anvil, and mechanism operatively connecting said supporting means to said driver to cause said supporting means to positively coöperate with said driver to straighten said stiffener, said driver and said anvil being adapted to coöperate to subsequently fasten said stiffener to said shoe shank.

14. In a machine for fastening a curved metal stiffener to a leatherboard shoe shank, two supports on which the ends of said stiffener are adapted to rest, respectively, a driver, and an anvil relatively movable, said supports and said driver being also relatively movable, and mechanism operatively connecting said driver to said supports to cause said driver and supports to positively coöperate to straighten said stiffener, said driver and said anvil being adapted to coöperate to fasten said stiffener to said shoe shank.

15. In a machine for fastening a curved metal stiffener to a leatherboard shoe shank, an anvil, a driver, a driver slide on which said driver is mounted, mechanism to impart a reciprocatory movement to said slide, whereby said driver is moved toward and away from said anvil, two supports upon which the ends of said stiffener are adapted to rest, respectively, two slides on which said supports are mounted, respectively, and mechanism operatively connecting said two slides to said driver slide, whereby said driver and said supports are adapted to coöperate to straighten said stiffener, said driver and said anvil being adapted to coöperate to subsequently fasten said stiffener to said shoe shank.

16. In a machine for fastening a curved metal stiffener to a leatherboard shoe shank, an anvil, a driver, a driver slide on which said driver is mounted, mechanism to impart a reciprocatory movement to said slide, whereby said driver is moved toward and away from said anvil, two supports upon which the ends of said stiffener are adapted to rest, respectively, two slides upon which said supports are movably mounted, respectively, mechanism operatively connecting said two slides to said driver slide, whereby said driver and said supports are adapted to coöperate to straighten said stiffener, said driver and said anvil being adapted to coöperate to subsequently fasten said stiffener to said leatherboard, and means for moving said supports out of engagement with said stiffener.

17. In a machine for fastening a curved metal stiffener to a leatherboard shoe shank, an anvil, a driver, a driver slide on which said driver is mounted, mechanism to impart a reciprocatory movement to said slide, whereby said driver is moved toward and away from said anvil, two supports on which the ends of said stiffener are adapted to rest, respectively, two slides on which said supports are mounted, respectively two toggles connecting said two slides, respectively, to said driver slide, and two cams adapted to actuate said toggles, respectively, whereby said supports are moved relatively to said driver and said stiffener is straightened, said driver and said anvil being adapted to coöperate to subsequently fasten said stiffener to said shoe shank.

18. In a machine for fastening a curved metal stiffener to a leatherboard shoe shank, an anvil, a driver, a driver slide on which said driver is mounted, mechanism to impart a reciprocatory movement to said slide, whereby said driver is moved toward and away from said anvil, two supports on which the ends of said stiffener are adapted to rest, respectively, two slides upon which said supports are mounted, respectively, two toggles connecting said two slides, respectively, to said driver slide, two cam rolls journaled on said toggles, respectively, and two stationary cams arranged in contact with said rolls, respectively, whereby said supports are moved relatively to said driver and said stiffener is straightened, said driver and said anvil being adapted to coöperate to subsequently fasten said stiffener to said shoe shank.

19. In a machine for fastening a curved metal stiffener to a leatherboard shoe shank, an anvil, a driver, a driver slide on which said driver is mounted, mechanism to impart a reciprocatory movement to said slide, whereby said driver is moved toward and away from said anvil, two supports on which the ends of said stiffener are adapted to rest, respectively, two slides on which said supports are slidably mounted to move toward and away from each other, springs arranged to move said supports toward each other, mechanism operatively connecting said two slides to said driver slide, whereby said driver and said supports are adapted to coöperate to straighten said stiffener, said driver and said anvil being adapted to coöperate to subsequently fasten said stiffener to said shoe shank, and means to move said supports away from each other out of contact with said stiffener.

20. In a machine for fastening stiffeners provided with perforations to leatherboard shoe shanks, a raceway provided with an inclined passage, a movable member provided with a passage located above and in vertical alinement with said inclined passage, a movable carrier adapted to deposit a tack or the like into said passage of said movable member, said movable member being adapted to subsequently deposit said tack into said inclined passage, a horizontal guide, means for feeding said stiffeners longitudinally of said guide, whereby said perforations are moved past said inclined passage, said inclined passage being adapted to guide said tacks toward said perforations, and mechanism for tacking said stiffeners to said shoe shanks, respectively.

21. In a machine for fastening stiffeners provided with perforations to leatherboard shoe shanks, a raceway provided with a plurality of inclined passages, a movable member provided with a plurality of passages located above and in vertical alinement with said inclined passages, respectively, a pivoted carrier provided with a plurality of passages adapted to guide tacks into said passages of said movable member, mechanism to impart a rocking movement to said carrier, said movable member adapted to subsequently deposit said tacks into said inclined passages, a horizontal guide extending transversely of said inclined passages, means for feeding said stiffeners longitudinally of said guide, whereby said perforations are moved past said inclined passages, said inclined passages being adapted to guide tacks toward said perforations and mechanism for tacking said stiffeners to said shoe shanks, respectively.

22. In a machine for fastening a curved metal stiffener to a leatherboard shoe shank, means to support said stiffener, two driving members relatively movable and mechanism operatively connecting said means to one of said driving members to cause said means and said member which is connected thereto to coöperate to straighten said stiffener and hold the same substantially straight until said stiffener and shank have been brought into contact with each other, said driving members being adapted to coöperate to fasten said stiffener to said shoe shank.

23. In a machine for fastening a curved metal stiffener to a leatherboard shoe shank, means to support said stiffener, an anvil and a driver relatively movable, and mechanism operatively connecting said means to said driver to cause said means and said driver to coöperate to straighten said stiffener and hold the same substantially straight until said stiffener and said shank have been brought into contact with each other, said driver and said anvil being adapted to coöperate to fasten said stiffener to said shoe shank.

24. In a machine for fastening a curved metal stiffener to a leatherboard shoe shank, instrumentalities adapted to coöperate to straighten said stiffener and hold the same substantially straight until said stiffener and said shoe shank have been brought into contact with each other, to fasten said stiffener to said shoe shank, said instrumentalities comprising means to support said stiffener, a member movable relatively to said means and adapted to engage said stiffener, and mechanism operatively connecting said member to said supporting means.

25. In a machine for fastening a curved metal stiffener to a leatherboard shoe shank, instrumentalities adapted to coöperate to straighten said stiffener and hold the same substantially straight until said stiffener and said shank have been brought into contact with each other, to fasten the same to said shoe shank, said instrumentalities comprising two relatively movable members adapted to engage said stiffener, and mechanism operatively connecting said members to cause the same to straighten said stiffener.

26. In a machine for fastening a curved metal stiffener to a leatherboard shoe shank, means to support said stiffener, a raceway, means to move said stiffener from said raceway onto said supporting means, an anvil and a driver relatively movable and mechanism operatively connecting said means to said driver to cause said means and said driver to coöperate to straighten said stiffener and hold the same substantially straight until said stiffener and shank have been brought into contact with each other, said driver and said anvil being adapted to coöperate to fasten said stiffener to said shoe shank.

27. In a machine for fastening a curved metal stiffener to a leatherboard shoe shank, an anvil, means to support said stiffener, said means being movable toward and away from said anvil, a driver movable toward and away from said anvil, and mechanism operatively connecting said means to said driver to cause said means to coöperate with said driver to straighten said stiffener and hold the same substantially straight until said stiffener and shank have been brought into contact with each other, said driver and said anvil being adapted to coöperate to fasten said stiffener to said shoe shank.

28. In a machine for fastening a curved metal stiffener provided with perforations to a leatherboard shoe shank, means for introducing tacks into said perforations, instrumentalities adapted to coöperate to straighten said stiffener and holding the same straight until said stiffener and shank have been brought into contact with each other, to fasten the same to said shoe shank, said instrumentalities comprising means to support said stiffener, a member movable relatively to said means and adapted to engage said stiffener, and mechanism operatively connecting said member to said support.

29. In a machine for fastening a curved metal stiffener provided with perforations to a leatherboard shoe shank, means for introducing tacks into said perforations, an anvil, means to support said stiffener, said means being movable toward and away from said anvil, means to move said stiffener from said tack introducing means onto said supporting means, a driver movable toward and away from said anvil, and mechanism operatively connecting said supporting means to said driver to cause said supporting means to coöperate with said driver to straighten said stiffener and hold the same substantially straight until said stiffener and shank have been brought into contact with each other, said driver and said anvil being adapted to coöperate to subsequently fasten said stiffener to said shoe shank.

30. In a machine for fastening a curved metal stiffener to a leatherboard shoe shank, two supports on which the ends of said stiffener are adapted to rest, respectively, a driver and an anvil relatively movable, said supports and said driver being also relatively movable, and mechanism operatively connecting said driver to said supports to cause said driver and supports to coöperate to straighten said stiffener and hold the same substantially straight until said stiffener and shank have been brought into contact with each other, said driver and said anvil being adapted to coöperate to fasten said stiffener to said shoe shank.

In testimony whereof I have hereunto set my hand in presence of two subscribing witnesses.

BRADFORD B. WATERMAN.

Witnesses:
LOUIS A. JONES,
SADIE V. MCCARTHY.